United States Patent

Tabler

[11] 4,091,907
[45] May 30, 1978

[54] SPEED CONTROL ATTACHMENT FOR GRAVITY ROLLER CONVEYOR

[75] Inventor: Charles P. Tabler, Hamilton, Ohio

[73] Assignee: Kornylak Corporation, Hamilton, Ohio

[21] Appl. No.: 803,264

[22] Filed: Jun. 3, 1977

[51] Int. Cl.² .................................... B65G 13/00
[52] U.S. Cl. ............................... 193/35 A; 188/80
[58] Field of Search ............... 193/35 R, 35 A, 35 B; 188/80, 262; 271/182, 229

[56] References Cited

U.S. PATENT DOCUMENTS

| 2,590,994 | 4/1952 | McKay | 193/35 A |
| 3,648,815 | 3/1972 | Wochner | 193/35 A |
| 4,006,810 | 2/1977 | Kornylak | 193/35 A |

Primary Examiner—Evon C. Blunk
Assistant Examiner—Jeffrey V. Nase
Attorney, Agent, or Firm—Beall & Jeffery

[57] ABSTRACT

A gravity undriven roller conveyor is provided with speed control so as to maintain articles travelling thereon within a narrow speed range generally independent of the length of the conveyor, the starting speed of the article, and the load of the conveyor by providing an elastomeric tired wheel on a bracket beneath the cylindrical rolls of a conveyor so as to engage two adjacent cylindrical rolls and absorb kinetic energy through hysteresis properties of the material of the elastomeric tire on the wheel. Vertical adjustment is provided with a rigid screw mounting or a biased spring mounting, and flanges radially overlapping the tire are provided on the wheel so as to limit the compression of the tire through such vertical adjustment to within the elastic limit of the elastomeric material.

8 Claims, 5 Drawing Figures

U. S. Patent    May 30, 1978    4,091,907
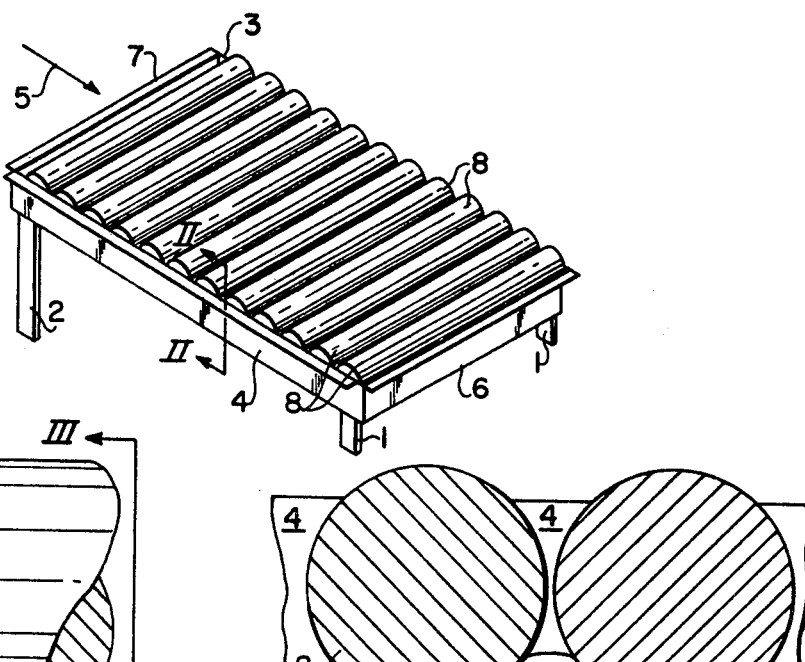
FIG. 1
FIG. 2
FIG. 3
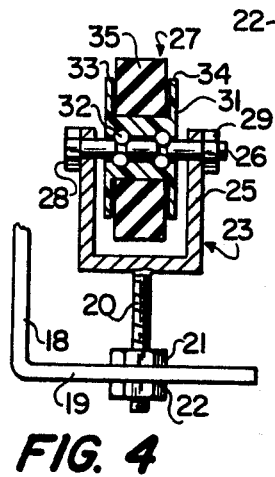
FIG. 4
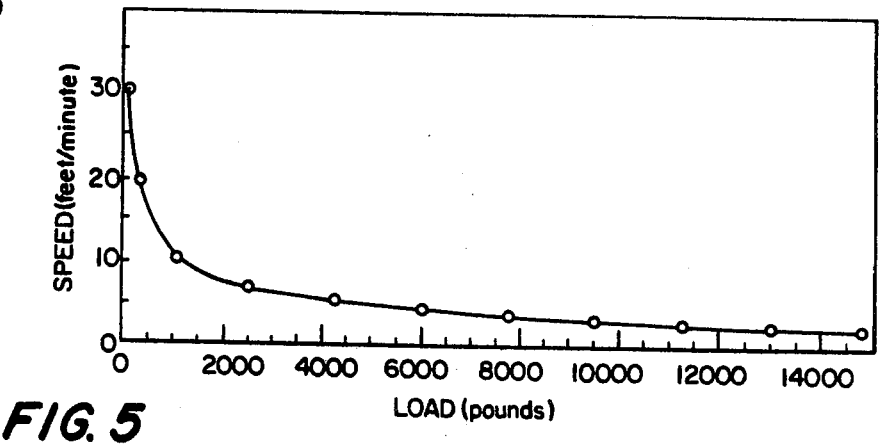
FIG. 5

SPEED CONTROL ATTACHMENT FOR GRAVITY ROLLER CONVEYOR

BACKGROUND OF THE INVENTION

The present invention relates to gravity undriven roller conveyors wherein articles are moved downwardly along an inclined array of cylindrical rolls that are closely spaced together and extend across substantially the entire width of the conveyor so as to accommodate articles having various bottom configurations such as pallets, boxes, and rimmed containers. The present invention also relates to the control of the speed of articles moving down a conveyor with a brake or retarder.

Undriven gravity rollerway conveyors are well known wherein the articles are supported on elongated cylinders that span substantially the entire width of the conveyor and which rolls are spaced closely together so as to accommodate variously configured bottom surfaces of articles. It is necessary on such conveyors to have the rolls closely spaced together so as to prevent portions of article bottoms from dropping down between rollers so as to prevent movement or require that the conveyor have an unreasonably large inclination that would with respect to other smooth bottom articles result in excess speeds. Various brakes or retarders are known for gravity conveyors that replace rolls or wheels of the conveyor to directly engage the articles, but such would be unsuitable for conveyors of the above type since they would present gaps that would interfere with movement of some articles along the conveyor.

SUMMARY OF THE INVENTION

The gravity rollerway conveyor includes two outside inclined parallel rails that rotatably mounted therebetween a plurality of parallel axis rolls that are closely spaced from each other and each spans substantially the entire width of the conveyor. At a plurality of positions along the conveyor length, as measured in the conveying direction, there are provided a plurality of brackets, each of which is secured to one rail so as to extend downwardly and inwardly beneath two adjacent rolls. On the bracket, there is mounted a wheel with vertical adjustability so as to directly engage the undersurface of two rolls with an elastic tire on such wheel. The elastomeric material of the tire is chosen so as to have high hysteresis properties for controlling the speed of articles being conveyed to within a narrow speed range over a wide range of loads, independently of the starting speed and independently of the starting speed and conveyor length. With the vertical adjustability, the elastomeric material is compressed and deformed by engagement with the adjacent rolls, but is prevented from being deformed beyond its elastic limit by means of annular flanges on the wheel that partially overlap the elastomeric tire.

BRIEF DESCRIPTION OF THE DRAWING

Further objects, features and advantages of the present invention will become more clear from the following detailed description of a preferred embodiment shown in the accompanying drawing, wherein:

FIG. 1 is a perspective view of a gravity roller-way conveyor of the present invention;

FIG. 2 is a partial cross sectional view taken at line II—II in FIG. 1;

FIG. 3 is a partial cross sectional view taken at line III—III of FIG. 2;

FIG. 4 is a view corresponding to that of FIG. 2 showing a variation of the bearing support of FIG. 2; and FIG. 5 is a diagram illustrating the speed control characteristics of the present invention.

DETAILED DESCRIPTION

The gravity rollerway conveyor shown in FIG. 1 is provided with two short front legs 1, and two longer rear legs 2 (only one of which is shown), which together rigidly support a frame on a support surface such as a floor. The frame comprises two parallel outside side rails 3 and 4, each of which are inclined downwardly in the conveying direction 5 and together are contained in a common plane sloping downwardly in the conveying direction 5. The frame further includes a horizontal front cross piece 6 rigidly interconnecting the front ends of the side rails 3 and 4, and a rear cross piece 7 rigidly interconnecting the rear ends of the side rails 3 and 4. A plurality of elongated cylindrical rolls 8 are provided in the above mentioned common plane with horizontally extending axes perpendicular to the side rails 3 and 4. The rolls 8 are mounted by means of bearing (partly shown in FIG. 2) at their opposite ends respectively to the side rails 3 and 4 so as to substantially span the entire width of the conveyor between such side rails 3 and 4. The rolls 8 are closely spaced together so as to provide support for variously shaped articles that may be conveyed. Since the mounting of the rolls 8 on the side rails 3 and 4 is substantially identical for both side rails, such mounting will be shown only with respect to side rail 4 in FIG. 2.

In FIG. 2, side rail 4 is preferably of a channel metal construction provided along its length with a plurality of evenly spaced holes 9 in its web 10 for receiving therein respectively axle shafts 11 of rolls 8. Such axle shafts 11 are preferably threaded so as to receive a nut 12 and washer 13 for securing the opposite ends of the rolls 8. While such axles 11 are rigidly secured to the side rails 3 and 4, it is to be understood that an antifriction bearing (not shown) is provided internally of the roll 8 between the roll 8 and the axle 11, so that the roll 8 is freely journaled on the axle 11.

As shown in FIGS. 3 and 4, a bracket 14 is rigidly secured to the rail 4 and extends beneath the rolls 8. The bracket 14 is provided with an upper outwardly extending flange 15 rigidly secured to a similar flange 16 of the side rail 4 by means of a bolt and nut 17; welding could be employed for such securement if desired. Bracket 14 is further provided with a web 18 extending vertically downwardly from the inside of the flange 15 to join with an inwardly extending flange 19 that extends substantially horizontally beneath the rolls 8. A hole (not shown) is provided generally centrally of the flange 19 of the bracket 14 for telescopically receiving therein a threaded shaft 20 having at its lower end beneath the flange 19 a pair of lock nuts 21, 22 to limit the upward movement of the shaft 20 relative to the flange 19. The upper end of the shaft 20 is welded to a U-shaped bearing support 23, and between the lower surface of the web 24 of the bearing support 23 and the upper surface of the flange 19, there is provided a coil spring 30, in compression and concentrically about the shaft 20. The opposite legs 25 of the U-shaped bearing support 23 are provided with horizontally aligned aperatures (not shown) for receiving therein the opposite ends of an axle 26 that freely rotatably supports a wheel 27. The axle 26 is secured by means of a head 28 and a nut 29. Preferably, an antifriction bearing is provided between the axle 26 and the wheel 27 within the interior of the wheel 27 in a conventional manner and as shown in FIG. 4.

In FIG. 4, there is shown a modification of the mounting for the bearing support 23. In FIG. 4, the spring 30 of FIG. 2 has been removed and the nuts 21 and 22 placed on opposite sides of flange 19 so as to rigidly secure the bearing support 23 to the flange 19. Adjustment is provided in the vertical direction between the shaft 20 and the flange 19 by loosening and retightening the nuts 21, 22. The remaining structure that is common to FIG. 4 and FIG. 2 is identical, and in FIG. 4 the rolls 8 and side rail 4 have been removed and the wheel 27 and bearing support 23 shown in a cross section taken on a plane through the axis of the axle 26 to more clearly show the construction of the wheel 27.

The wheel 27 is provided with a molded synthetic resin hub 31 having two inner annular bearing races receiving therein roller bearings 32 that are similarly received within annular outer races formed on the shaft 26. The hub 31 is further provided with opposite side radially extending flanges 33, 34 that form an annular outwardly opening trough receiving therein an elastomeric tire 35. Preferably, the elastomeric tire has a radial thickness of substantially twice the radial depth of the flanges 33, 34.

The tire 35 is constructed of an elastomeric material that may be a natural rubber formulation, a synthetic rubber formulation, or a synthetic resin such as polyurethane with specific properties to be set forth in detail below. Among these properties is that of an elastic limit wherein compression below the elastic limit will elastically deform the tire whereas compression above the elastic limit will permanently deform the tire. Preferably, the axial spacing between the flanges 34 and 33 is sufficiently greater than the axial dimension of the tire 35 so as to provide room to receive the compressed tire 35 when it is forced against a roll 8 (not shown in FIG. 4) to a sufficient degree such that the roll 8 will engage the outermost surfaces of the rigid substantially incompressible flanges 33, 34 without exceeding the elastic limit of the material of the tire 35. Thus in addition to retaining the tire 35 on the hub 31, the flanges 33 and 34 will limit the compression of the tire 35 to within the elastic range wherein only elastic deformation of the tire takes place during relative rolling contact between the rolls 8 and tire 35. The tire 35 may be bonded by means on an adhesive directly to the hub 31, or it may be unbonded.

As a further modification of the fixed screw adjustment of FIG. 4 and the spring bias adjustment of FIG. 2, the mounting 23 may employ a washer around the shaft 20 and in direct engagement with the top of the coil spring, and an additional nut about such washer to adjust the compression of the spring 30 in FIG. 2 so as to vary the speed control characteristics of the conveyor, particularly with respect to various average temperatures to be employed in the conveyor environment.

It is an important feature of the present invention that the wheel 27 engage the undersurface of two adjacent rolls 8 with the bracket 14 being positioned so that the vertically extending shaft 20 will be on a line centered vertically between such two adjacent rolls, so that a simple mounting for the wheel 27 may be provided that does not need to resist forces axially of the wheel 27, or resist forces along the line of the conveying direction, or resist torques, but instead needs only to resist the vertical force of compressing the elastomeric tire 35 against the rolls 8. It is only necessary to provide one wheel 27 for each pair of rolls 8, and such wheel may be mounted by its bracket 14 on either one of the rails 3 and 4. The features of the present invention are accomplished with only a small number of such wheels 27 spaced along the length of the conveyor, so that for example one wheel 27 would be provided for every fourth or fifth pair of rolls 8. The wheel 27 is mounted entirely beneath the rolls 8 and in this manner does not interfere with the advantages gained by the rolls 8 being closely spaced to each other and extending for substantially the full width of the conveyor so as to accommodate variously shaped bottoms for articles to be conveyed. Further due to the simplicity of its construction, the bracket 14 mounting 23 and wheel 27 may be added as a unit to existing conveyors without modifying the structure of existing conveyors in any way except perhaps to provide a mounting hole or other means for securement of the bracket 14.

While not necessary to have a wheel 27 engaging each pair of rolls 8, there are advantages to such a construction in that the elastomeric tires will reduce vibrations and noise resulting from conveying articles along the rolls 8.

In a gravity conveyor of this type, there is the problem that articles stored on the conveyor must start up by themselves when a storing restraint is removed, which start up characteristics are improved with an increased inclination of the conveyor; whereas, there is a different problem relating to an article moving down a gravity conveyor increasing in speed continuously as it moves down the conveyor without some specific means for stopping it, which problem is reduced by decreasing the inclination of the conveyor. While existing braking devices go a long way towards reducing both these problems in some gravity conveyors, there complexity, cost, and interference with the conveying surface of the conveyor make them generally unsuitable for a conveyor of the present type wherein rolls are provided extending across the entire width of the conveyor and closely spaced with respect to each other. The above mentioned problems are further complication by the fact that the problems are increased proportionately with an increase in the weight of the load.

The elastomeric tires 35 preferably have a Shore durometer hardness of from 60 to 85A. However, the hardness of such a tire has nothing to do with other characteristics such as hysteresis or compression set. Preferably, the compression set of such tires is maintained at less than 5%. However, it is the hysteresis characteristics of the tires that is critical with respect to the present invention, with the hysteresis characteristics of the tire being such that kinetic energy will be absorbed by the tires and converted to heat, with a greater amount of kinetic energy being absorbed with a corresponding increase in speed of articles moving down the conveyor that resuls in an increased speed in rotation of the tire 35. As shown in FIG. 5, an empty pallet placed upon a conveyor constructed according to the present invention will attain a speed of approximately 30 feet per minute and stabilize after being released at the top of the conveyor, and it is seen that as the load is increased, such stabilized speed will decrease to where at a 1,000 pound load, the speed will stabilize at 10 feet per minute. With a change of load between 2,000 and 15,000 pounds, there will be a very small change in the stabilized speed of the load on the conveyor, as it changes from 7.5 feet per minute to 2.5 feet per minute. This stabilized speed is attained usually within the first 10 feet of the conveyor length regardless of the starting speed, and is not thereafter increased, that is an increase in the conveyor length will not increase the stabilized speed. This is in contrast to an article moving down an identical conveyor not having the braket 14, mounting 23 and wheel 27 providing the speed control of the present invention, because such an article would continually increase in speed the longer it moved down the conveyor. It is thus seen that the speed control characteristics of the present invention are independent of conveyor length so long as a minimum conveyor length is provided within which a stationary article may move up to its stabilized speed or a pushed initially fast article may be slowed down to its stabilized speed, with such stabilizing length generally being about 10 feet. The curve shown in FIG. 5 is representative and may be adjusted with respect to its characteristics by increasing the force with which the elastomeric tire 37 engages the rolls 8 by adjusting the compression of the spring 30 or by adjusting the screw adjustment of FIG. 4. Further modification of the characteristics may be provided by different elastomeric material formulations having different high hysteresis properties. As mentioned, the hysteresis properties of the speed control attachment of the present invention will assure that an article initially pushed at a high speed along the conveyor will be quickly slowed down to within the narrow speed range indicated by FIG. 5. As an example, a 1,100 pound load moving down a conveyor with a speed control attachment of the present invention and moving the same conveyor but without the speed control attachment of the present invention would produce markedly different results while being carried with an identical pallet and may travel a top speed of apprximately 240 feet per minute after a 40 foot run on the uncontrolled conveyor in contrast to travelling at a steady 11 feet per minute on the controlled conveyor.

While preferred embodiments of the present invention have been shown in the drawing and set forth in the description in considerable detail for purposes of illustration and the advantages of their details, it is contemplated that further embodiments, modifications and variations may be produced according to the broader aspects of the present invention, all is determined by the spirit and scope of the following claims.

What is claimed:

1. A gravity undriven roller conveyor, comprising:
   a stationary inclined rigid conveyor support having opposite outside side rails parallel to each other and the conveying direction, and each outside side rail being inclined downwardly in the conveying direction;
   a plurality of substantially identical idler conveyor rolls having an elongated cylindrical shape extending substantially completely between said outside side rails, and said conveyor rolls being serially arranged in the conveying direction downwardly along said inclined conveyor support;
   bearing means freely rotatably mounting each of said rolls at its opposite ends directly on respective ones of said outside side rails with all of said conveyor rolls having parallel axes of rotation in a common plane inclined downwardly in the conveying direction, and said axes being perpendicular to said conveying direction for supporting loads solely on the top surfaces of said conveyor rolls and conveying loads from the upper portion of said inclined conveyor support to the bottom of said inclined conveyor support solely by gravity;
   a plurality of brackets spaced along said conveying direction, with each of said brackets being rigidly mounted on only one of said outside side rails and extending downwardly inwardly and toward the other of said outside side rails beneath the adjacent conveyor rolls;
   a plurality of wheels separate from and independent of said bearing means, each having an elastomeric outside tire in direct engagement with the undersurface of two adjacent conveyor rolls, each of said elastomeric tires having an elastic limit of compression beyond which it will be permanently deformed and less than which it will be elastically deformed, each of said elastomeric tires being elastically deformed against each of said adjacent conveyor rolls, and each of said elastomeric tires further being constructed of a material having hysteresis properties when in rolling contact with said conveyor rolls;
   means mounting each of said wheels on a respective one of said brackets with relative adjustment in the vertical direction toward and away from said adjacent conveyor rolls to adjust said elastic deformation of said elastomeric tires against said conveyor rolls;
   said wheels with elastomeric tires having high hysteresis properties, said brackets and said mounting means constituting speed control means for increasing the speed of articles being gravity conveyed on said conveyor rolls up to a fixed narrow speed range, decreasing the speed of articles being gravity conveyed on said conveyor rolls at any speed above said narrow speed range down to said narrow speed range by converting the kinetic energy of said articles above said narrow speed range to heat by the high hysteresis property of said elastomeric tires, and further decreasing the speed of articles being conveyed within said narrow speed range in correlation with an increase in the weight of said articles, all independently of the length of said conveyor.

2. The conveyor of claim 1, wherein said bracket includes a top flange secured to its outside side rail, a web extending downwardly from the inner portion of said top flange and a bottom flange extending inwardly from the lowermost portion of said web so as to be cantilevered beneath its adjacent conveyor rolls; said mounting means including a U-shaped bearing support having opposite vertically extending legs with horizontally aligned aperatures, a bearing axle extending through said aperatures and being secured to said U-shaped bearing support and mounting at its mid-portion its associated wheel for free rotation; said mounting means further having a shaft rigidly secured to the web of said U-shaped bearing support and extending vertically downward therefrom, said bottom flange of said bracket having a vertical aperature receiving therethrough said shaft with vertical adjustment.

3. The conveyor of claim 2, wherein said shaft is threaded and includes a nut threaded on said shaft in engagement with the top surface of said bottom flange and a nut threaded on such shaft in engagement with the bottom surface of said bottom flange of said bracket to rigidly secure said shaft adjustably on said bracket.

4. The conveyor of claim 2, including a coil compression spring telescopically arranged in compression around said shaft and having one end in engagement with the lower surface of the web of said U-shaped bearing support and its opposite end in engagement with the upper surface of said bottom flange of said bracket.

5. The conveyor of claim 1, wherein said speed control means maintains said narrow speed range under standard temperature between 7.5 and 2.5 feet per minute for a load variation of 2,000 to 15,000 pounds independently of the length of said conveyor and independently of the starting speed of said load for a conveyor length of at least ten feet.

6. The conveyor of claim 1, wherein each of said wheels includes a rigid hub having an outer annular bearing surface concentric with its axis of rotation and a pair of axially spaced annular flanges extending radially outwardly from axially opposite sides of said outer annular bearing surface; said elastomeric tire being annular and mounted on the outer annular bearing surface of its wheel between said annular flanges and having an inner annular bearing surface of complementary shape with said wheel outer annular bearing surface, and said elastomeric tire having a radial thickness greater than the radial depth of said annular flanges so as to extend radially outwardly beyond said flanges; and said annular flanges being of a radial depth relative to the radial thickness of said tire to completely receive the elastomeric material of the tire and directly engage the adjacent conveyor rolls before the elastic limit of said elastomeric tires is reached under radial compression during adjustment of said mounting means.

7. The conveyor of claim 6, wherein the radial thickness of said elastomeric tires is approximately twice the radial depth of said annular flanges and correspondingly said elastomeric tires may undergo compression greater than 50% without being permanently deformed to take a compression set.

8. The conveyor of claim 1, wherein said tire is constructed of urethane having a Shore durometer hardness from 60 to 85A.

* * * * *